No. 691,218. Patented Jan. 14, 1902.
J. WEST.
APPARATUS FOR ATTACHING HOLDING DEVICES TO LENSES WHILE SUCH LENSES ARE BEING SHAPED AND EDGED.
(Application filed May 20, 1901.)
(No Model.) 2 Sheets—Sheet 2.
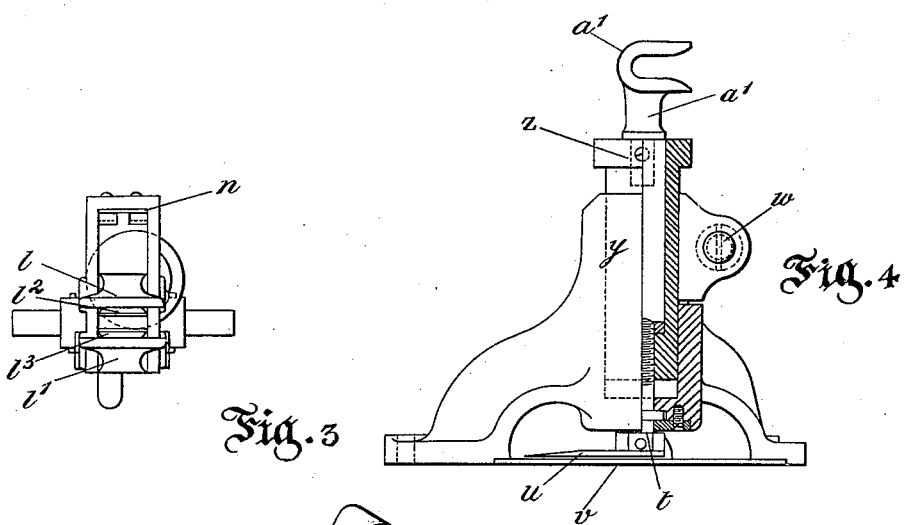
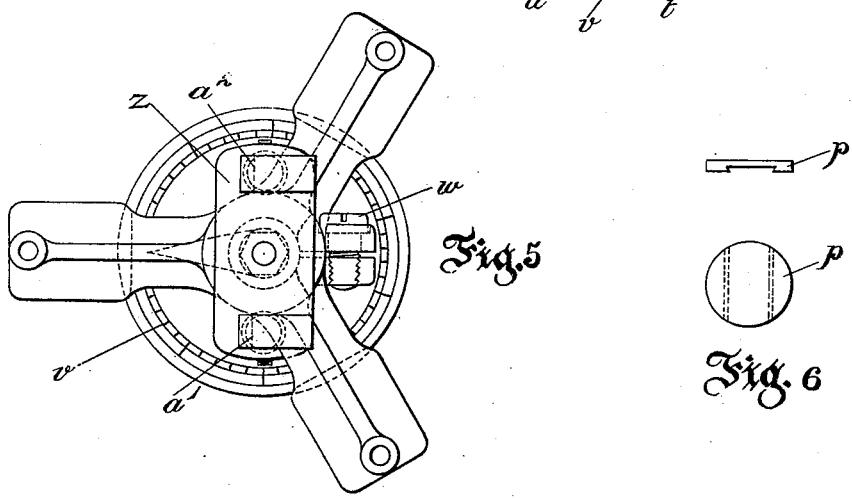
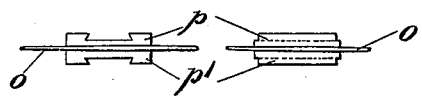
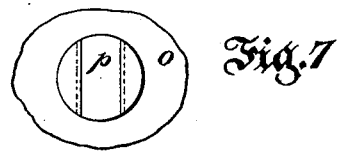

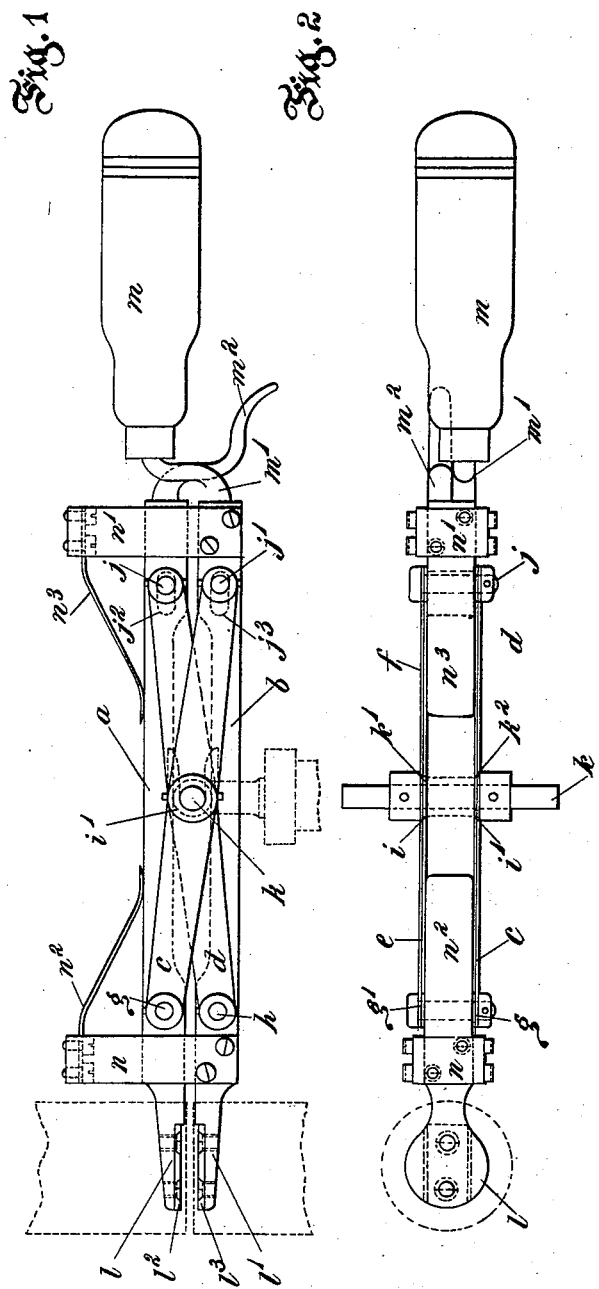

UNITED STATES PATENT OFFICE.

JAMES WEST, OF DALSTON, ENGLAND, ASSIGNOR OF TWO-THIRDS TO HENRY JOSEPH WILBERFORCE RAPHAEL, OF SHEPHERDS BUSH, MIDDLESEX COUNTY, ENGLAND, AND HERMANN LIONEL ETTINGHAUSEN, OF LONDON, ENGLAND.

APPARATUS FOR ATTACHING HOLDING DEVICES TO LENSES WHILE SUCH LENSES ARE BEING SHAPED AND EDGED.

SPECIFICATION forming part of Letters Patent No. 691,218, dated January 14, 1902.

Application filed May 20, 1901. Serial No. 61,136. (No model.)

*To all whom it may concern:*

Be it known that I, JAMES WEST, a subject of the King of Great Britain, residing at Dalston, in the county of Middlesex, England, have invented a certain new and useful Improvement in Apparatus for Attaching Holding Devices to Lenses While Such Lenses are Being Shaped and Edged, of which the following is a specification.

My invention relates to an improved device by which lenses which are to be ground and edged (in the machine which is fully set forth and claimed in my concurrent application, Serial No. 61,137, filed May 20, 1901) have supports or "dops," by which they are carried in the said machine, affixed to them upon both sides, so that they are perfectly, truly, and accurately adjusted and fixed and in a very short time. I attain these objects by the means illustrated in the accompanying drawings, in which—

Figure 1 represents a side view of the adjusting-tongs. Fig. 2 represents a plan of the same. Fig. 3 represents a front elevation of the same. Fig. 4 represents a side view, and Fig. 5 represents a plan, of the standard which is used in conjunction with the tongs. Fig. 6 shows a side view and a plan of one of the dops. Fig. 7 shows two side views and a plan of these dops attached to each side of the lens.

Similar letters refer to similar parts throughout.

According to this invention the pieces which it is proposed to attach to the lenses for the purpose of holding them while they are being shaped and edged and which are called "dops" are of the construction and shape shown in Fig. 6 of the accompanying drawings. I prefer, for the reason hereinafter explained, to attach two of these dops to each lens—that is to say, one on each face—in the manner shown in Fig. 7, wherein $o$ is the lens, and $p\,p'$ the dops. In conjunction with the dops I use pitch or any other suitable substance for the purpose of making them adhere firmly and securely to the lens.

In order that the focal center of the lens may coincide with the geometrical center when the said lens is edged and finished, it is necessary that the dops should be not only accurately attached to the lens in relation to the focal center of the latter, but that they should be also attached in accurate relation to each other. For this purpose I use a pair of what I call "parallel" tongs—that is to say, a pair of tongs whose two jaws move parallel to and from each other, as shown in the drawings. These parallel tongs are shown in the accompanying drawings and are constructed in the following manner—that is to say, the parallel bars $a$ and $b$ of these tongs are united through the medium of two pairs of cross-links, whereof $c\,d$ and $e\,f$ are the members, jointed at $g\,g'$, $h\,h'$, and $i\,i'$. Pins $j\,j'$ pass transversely through the slots $j^2\,j^3$ in the bars $a$ and $b$ and unite the free ends of the links $c\,d$ and $e\,f$, so as to enable them to move in unison. During any movement of the bars $a$ and $b$, the pins $j$ and $j'$ slide in the slots $j^2$ and $j^3$. A trunnion-pin $k$ passes (at $k'$ and $k^2$) transversely through the links $c\,d$ and $e\,f$, which are freely jointed upon the pin. The jaws $l\,l'$, forming the nose of the bars $a$ and $b$, are provided with short pieces or strips of metal $l^2\,l^3$ of a dovetailed shape in transverse section to allow the dops to fit and slide upon them from the front end and to become more or less securely held while the tongs are being used. A handle $m$ is attached through the medium of the bent tang $m'$ to the end of the bar $b$, while another bent tang $m^2$, attached to the bar $a$, crosses at the side of the tang $m'$ and is brought down to a convenient point where it terminates and is capable of being controlled by the forefinger of the operator. Two guides $n$ and $n'$ serve to keep the bars $a$ and $b$ more accurately in alinement with each other, while springs $n^2$ and $n^3$ keep the bars $a$ and $b$ pressed together and cause the tongs to close when the pressure of the forefinger of the operator is released or removed.

Figs. 4 and 5 represent a standard used in conjunction with the above tongs and necessary for determining the correct position of the tongs in relation to the lens at the moment of attaching the dops to the latter. This standard is fixed opposite to an orifice in the centering apparatus by which the focal center of the lens is ascertained and which is fully set forth and claimed in my concurrent application, Serial No. 61,135, filed May 20, 1901. This centering apparatus consists of two cylindrical tubes arranged one above the other accurately in line with each other and having their adjoining ends accurately faced and at right angles to the center line of the tubes, the upper tube being capable of sliding vertically in a guide and the lower tube being carried in a fixed guide or socket, the lens being placed between the adjoining ends of the tubes and being adjusted by hand until it is uniformly bedded between them, its center thus corresponding with the center of the tubes. The orifice described is made in the side of both tubes—that is to say, partly in the lower end of the upper tube and partly in the upper end of the lower tube. The relative positions of the standard and the centering apparatus are shown in Figs. 1 and 2, in which the tubes of the centering apparatus are shown in dotted lines and are also shown occupying their normal position in relation to the other apparatus.

$a'$ and $a^2$ are two forked or Y bearings flared to receive the trunnion-piece $k$ of the tongs hereinbefore described, whereby the said tongs are supported and otherwise held in a position relatively true with the lens. The forked and flared trunnion-bearings $a'$ and $a^2$ are independently adjustable in the devices $z$, while they are conjointly elevated or depressed in the adjustable device $y$ by means of a screw $t$, having a collar held and turning in the bottom of the guide $y$. The screw screws into the bottom of the cylindrical part of the devices $z$, which are raised or lowered in the guide $y$ as the screw is turned. When adjusted to the exact height, the parts are firmly held by the clip and bolt $w$. The trunnion-bearings $a'$ and $a^2$ and the device $z$, which carries them, may also be made capable of a slight horizontal rotation in order to bring the nose of the tongs slightly obliquely to the centering apparatus and in this way affix the dops slightly out the center of the lens. This would produce what is termed "decentering," as it causes the optical center not to coincide exactly with the geometrical center. This decentering is found advisable in order to compensate for the slightly-varying distance between the eyes of persons using the lenses in spectacles and the like. A lever-arm $u$ is attached to the lower end of the screw $t$ and moves over the dial $v$, which is graduated, so as to accurately measure the amount of rise or fall of the trunnions. It will be seen, therefore, that the method of attaching the dops to the surface of the lens involves the use of the centering apparatus of the kind described above, in combination with the parallel tongs and the standard herein described, and consists as follows: The lens is carried to the said centering apparatus and having been centered is left securely held therein ready to receive the two dops which it is desired to attach. I now slide the two dops upon the dovetailed strips within the nose of the tongs herein described, having previously warmed the dops and applied hot pitch to their faces. I then open the tongs sufficiently and quickly enter the nose thereof into the orifice in the front of the tubes of the centering apparatus, carrying one dop above and one below the lens already held in readiness to receive them. I next see that the trunnion-pin has entered and come to rest in the forked and flared bearings $a'$ and $a^2$ of the standard, which are adjusted exactly to the required height, and I then release the pressure of the forefinger, thereby allowing the tongs to close and bring the two dops into contact with the lens. The lens with the two dops adhering to it may now be removed from the centering apparatus. For this purpose it is merely necessary to raise the upper cylindrical tube, when the tongs may be freely withdrawn, bringing the lens away with them. Taking the lens between his thumb and finger, the operator is now able to slide the whole bodily out from the mouth of the tongs and lay it aside. I affix two dops to each lens, as the subsequent operation of "edging," as set forth in Letters Patent No. 629,634, requires that the lenses shall be reversed during the process.

Having fully described my invention, what I desire to claim and secure by Letters Patent is—

1. The apparatus for attaching holding devices to lenses, consisting of tongs having parallel moving jaws connected by jointed bars, and pressed together by springs, and operated by pressure upon a finger-bar, strips dovetailed in cross-section upon the opposite faces of the jaws, to receive corresponding "dops" or lens-holders, and a transverse trunnion passing through the centers of the jointed bars where they cross each other, and adapted to fit accurately in bearings carried by a standard which receives the tongs, and which is itself arranged opposite to a suitable lens-centering device, substantially as described.

2. In tongs of the character described, the combination of the parallel bars $a$, $b$, connected by cross-links $c$, $d$, and $e$, $f$, jointed at $g$, $g'$, $h$, $h'$, and $i$, $i'$; pins $j, j'$, passing through slots $j^2$, $j^3$, in the bars $a$, $b$; trunnion $k$; jaws $l$, $l'$, provided with dovetail-shaped strips $l^2$, $l^3$, to receive dops to hold the lens, substantially as set forth and illustrated.

3. In tongs of the character described, the combination of the standard carrying adjustable forked bearings $a'$ and $a^2$ to receive the trunnion $k$ on the tongs and a guide $y$ in which the bearings $a'$, $a^2$ can be conjointly elevated and depressed as desired, by the screw $t$, arm $u$, and graduated dial $v$, and fixed by the clip and bolt $w$, substantially as set forth and illustrated.

4. In tongs of the character described, the combination with a bar having a handle on one end, a nose on the other end, and guides secured to said bar between the nose and handle; of a second bar adapted to move in said guides and having a nose at one end and a finger at the other end, cross-links pivoted at one of their ends to the said bars and at their other ends pivoted to slide on said bars, the said cross-links being pivoted together at their centers, and having trunnions, substantially as described.

5. In tongs of the character described, the combination with a bar having a handle on one end, a nose on the other end, and guides secured to said bar between the nose and handle; of a second bar adapted to move in said guides and having a nose at one end and a finger at the other end, means on said noses for holding dops, cross-links pivoted at one of their ends to the said bars and at their other ends pivoted to slide on said bars, the said cross-links being pivoted together at their centers, and having trunnions, substantially as described.

In witness whereof I have hereunto set my hand in the presence of two witnesses.

JAMES WEST.

Witnesses:
ALFRED T. BRATTON,
H. ARTHUR MARSHALL.